No. 770,073. PATENTED SEPT. 13, 1904.
C. W. KENNEDY & F. A. POCOCK.
S. H. KENNEDY, ADMINISTRATRIX OF C. W. KENNEDY, DEC'D.
METHOD OF CONTROLLING ELECTRIC MOTORS.
APPLICATION FILED APR. 16, 1902.
NO MODEL. 4 SHEETS—SHEET 1.

Witnesses:—

Inventors:—
Charles W. Kennedy &
Francis A. Pocock,
by their Attorneys;
Howson & Howson

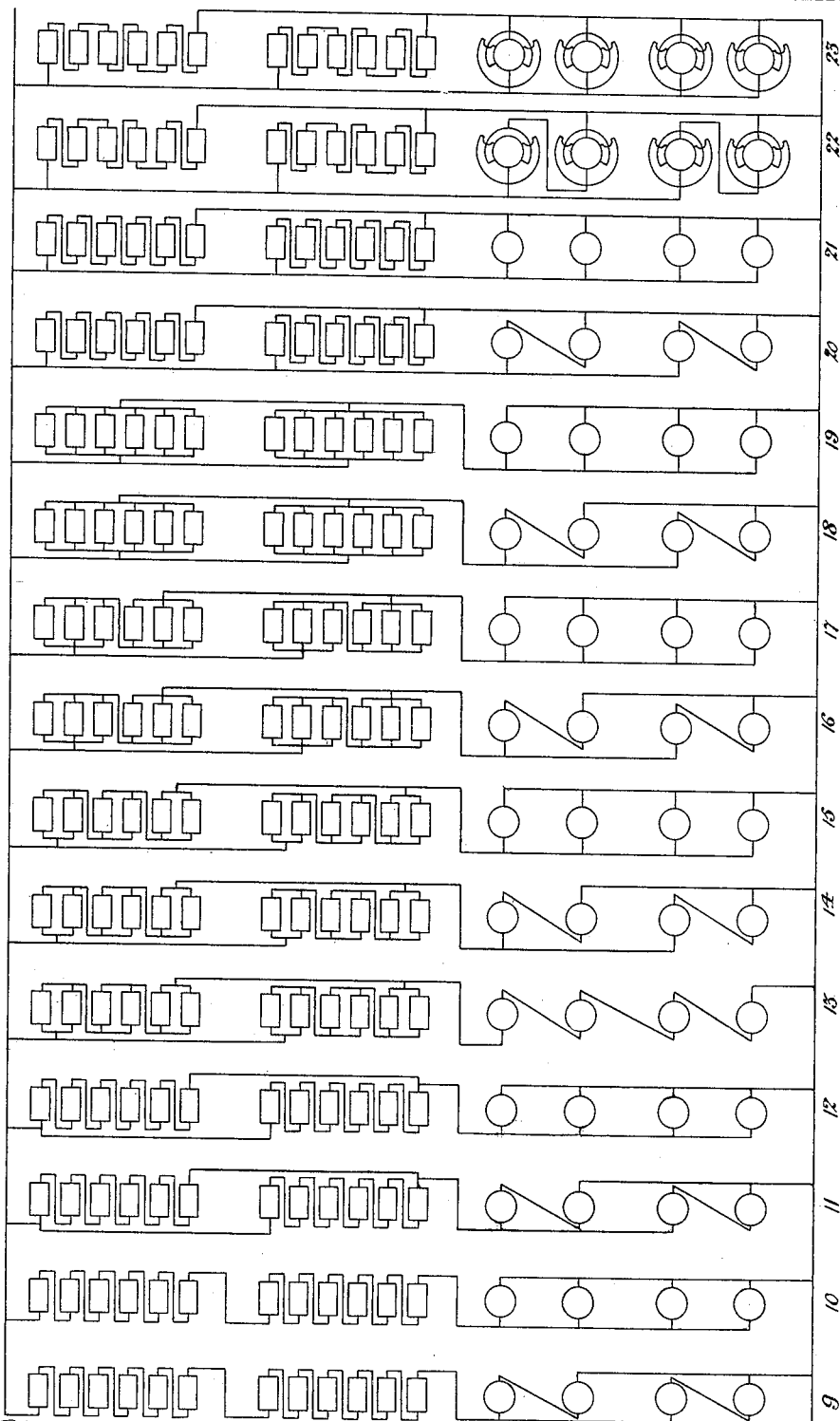

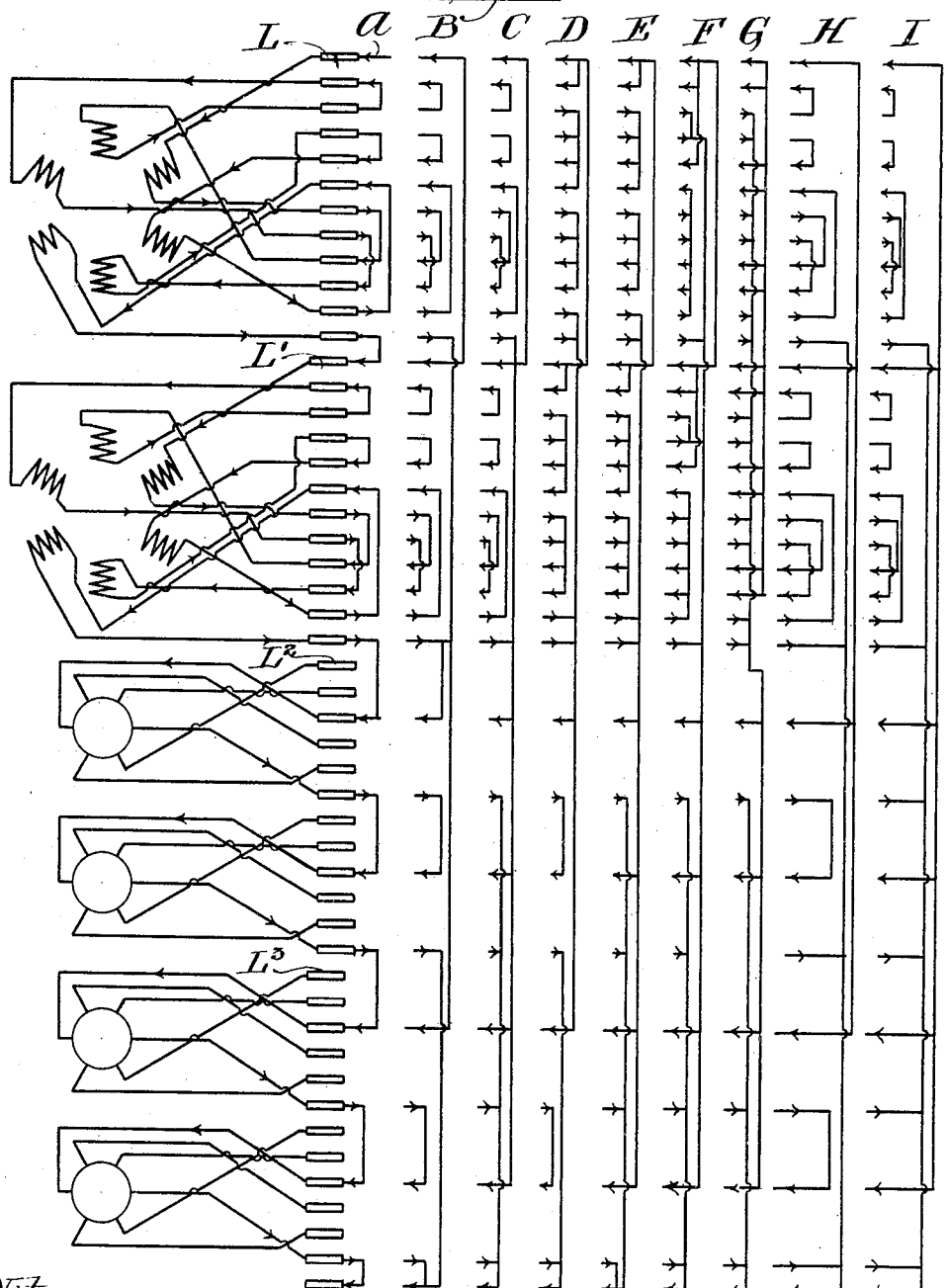

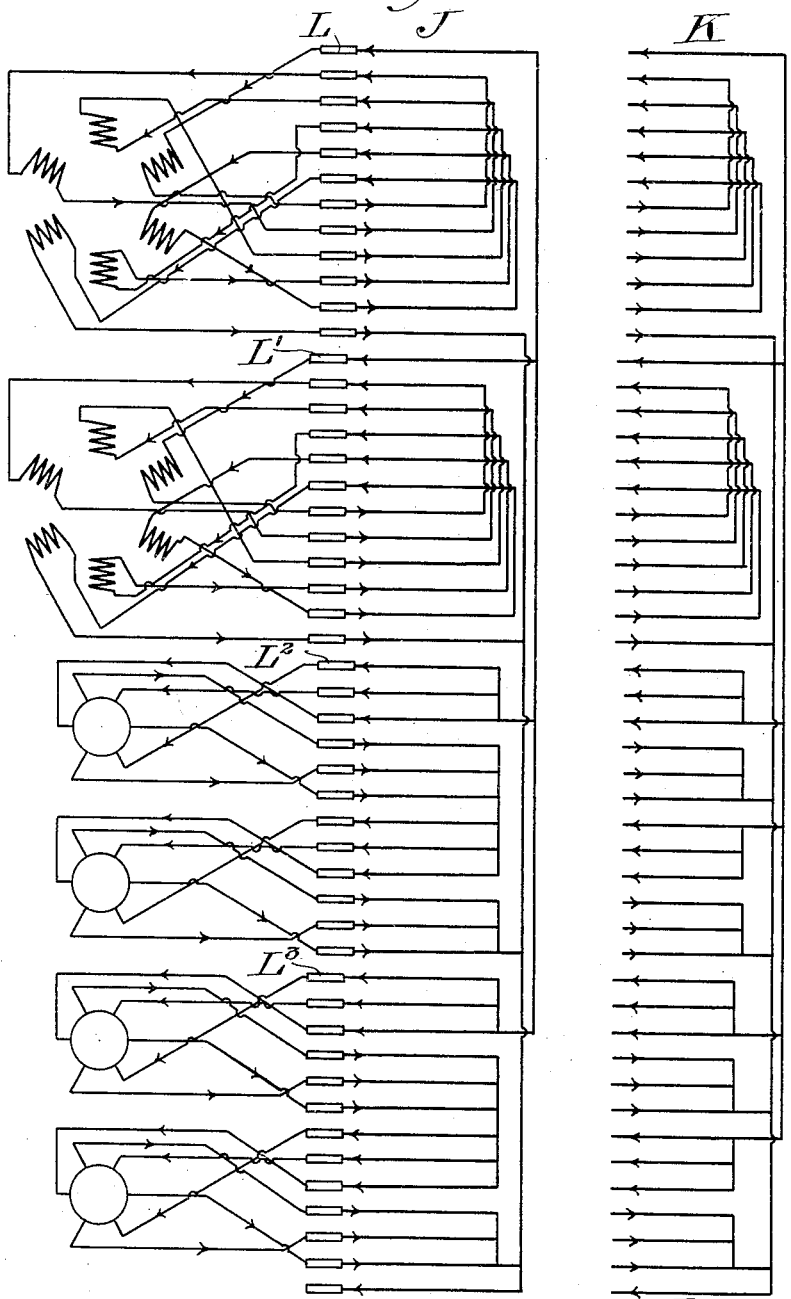

No. 770,073.

Patented September 13, 1904.

UNITED STATES PATENT OFFICE.

CHARLES W. KENNEDY, OF RUTLEDGE, AND FRANCIS A. POCOCK, OF LANSDOWNE, PENNSYLVANIA; SARAH H. KENNEDY ADMINISTRATRIX OF SAID CHARLES W. KENNEDY, DECEASED; SAID FRANCIS A. POCOCK AND SAID ADMINISTRATRIX ASSIGNORS OF THREE-EIGHTHS TO EDWARD W. PATTON, OF PHILADELPHIA, PENNSYLVANIA.

METHOD OF CONTROLLING ELECTRIC MOTORS.

SPECIFICATION forming part of Letters Patent No. 770,073, dated September 13, 1904.

Application filed April 16, 1902. Serial No. 103,145. (No model.)

*To all whom it may concern:*

Be it known that we, CHARLES W. KENNEDY, residing at Rutledge, and FRANCIS A. POCOCK, residing at Lansdowne, Delaware county, Pennsylvania, citizens of the United States, have invented certain Improvements in Methods of Controlling Electric Motors, of which the following is a specification.

Our invention relates to certain improvements in the method of controlling the speed of two or more motors, and more particularly to an improved system for operating two or more motors without employing external resistance.

The object of our invention is to provide a system of the character indicated above in which current is supplied to two or more motors when they are first started in such manner that they are operated as series machines and after they have attained the desired speed of rotation the connections of the various windings of the motors are altered so that these motors are operated as shunt-wound machines. This object we attain as hereinafter set forth, reference being had to the accompanying drawings, in which—

Figure 1:
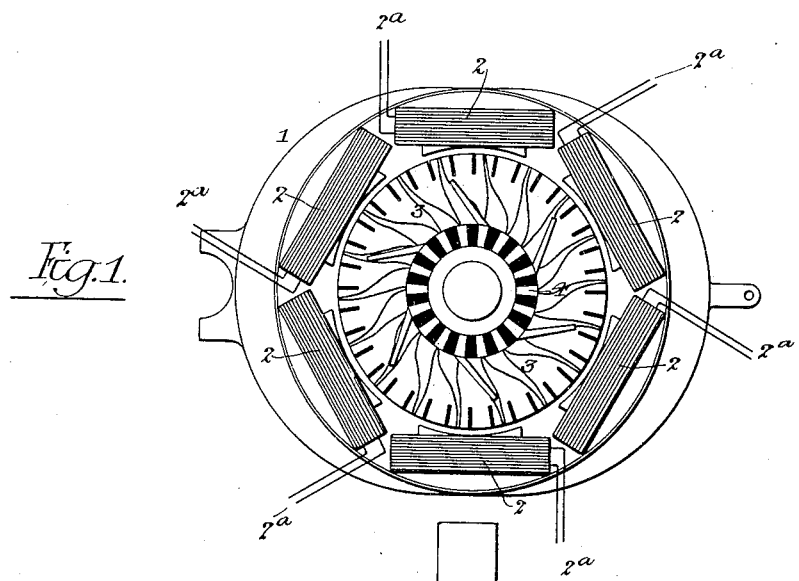
Figure 2:
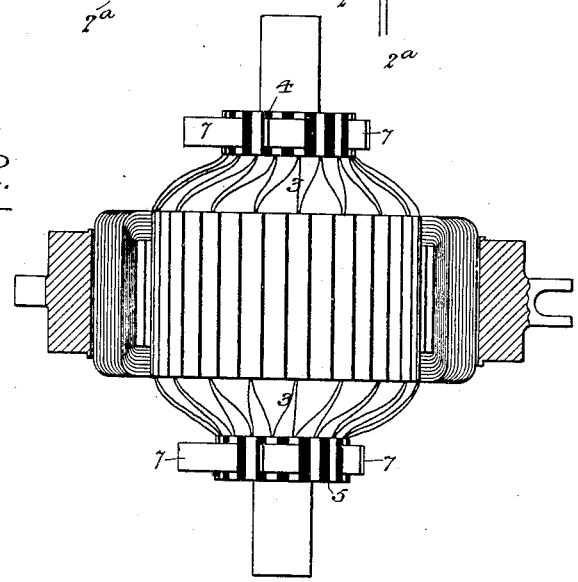
Figure 3:
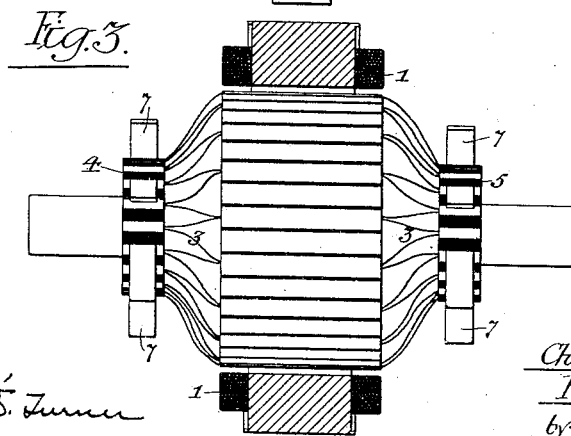

Figures 1, 2, and 3 are views of the type of motor preferably used in connection with our improved system of control. Fig. 4 shows a series of diagrammatic views illustrating various combinations of field and armature windings of two motors when they are operated by our improved system of control and without the use of external resistance; and Figs. 5 and $5^a$ are diagrammatic views of one form of controller by which our improved method of motor control may be carried out, said views also illustrating the connections of the fields and armatures of two motors to said controller.

In carrying out our invention we preferably employ multipolar motors, and in the present embodiment of our invention we have shown two motors, each having six field-coils. The armatures of the motors have each two independent windings, being provided at each end with a commutator which is connected in any of the well-known ways to its particular set of coils on the armature.

As will be seen from reference to Figs. 1, 2, and 3, 1 is the frame of the motor, having six field-coils 2, the ends of which are indicated at $2^a$, said motor being provided with an armature 3, whose two commutators are shown at 4 and 5. As in an ordinary multipolar machine, there is a brush-holder arm, with the brushes 7 bearing on the commutator for each of the field-coils, and it will be understood that the terminals of each field-coil, as well as the terminals of each brush-holder arm, are led to a suitable controller in order that the various combinations of these different elements may be made as indicated in the diagrams shown in Fig. 4.

In Figs. 5 and $5^a$ we have illustrated diagrammatically a controller by which our improved method of control as applied to two six-pole motors may be carried out. The barrel or revoluble part of the controller, with its segments and connections for eleven of the more important points, which are indicated by the reference-letters A to K, inclusive, is shown in said views as developed. The fixed contacts or fingers of the controller are represented, respectively, at L, L', $L^2$, and $L^3$, the contacts L and L' being connected to the various field-coils of the motors and the contacts $L^2$ and $L^3$ being connected to the brushes of the motor-armatures. In Fig. 5 the field and armature windings and connections for the bipolar points of the controller are shown, A to I, inclusive, while in Fig. $5^a$ the field and armature windings and connections for the multipolar points of the controller are shown for J and K, it being understood that these various windings and connections are combined in a single controller and shown developed in the particular manner for the sake of clearness.

While the controller illustrated by the diagrammatic views Figs. 5 and 5ª and described above shows the connections for what are at present considered the best running-points for our system, we shall set forth in detail hereinafter a majority of the various possible combinations of the motor fields and armatures, which combinations are illustrated in the diagrams shown in Fig. 4. As will be seen from these diagrams, we so arrange the contacts that in starting two motors of the type indicated in Fig. 1 the current will pass through the two sets of field-coils of the two machines in series, passing thence to the four sets of armature-windings, as indicated at 10.

In supplying the current from the field-coils to the armatures of the motor it is to be noted that this is done as though the armatures were operating in bipolar motors, the current entering each armature by a single brush-holder arm and leaving it by one diametrically opposite, the four remaining brushes and their connections not being utilized at this time.

As will be noted from the diagrams illustrated at 9 and 10 in Fig. 4, the connections of the motors on the first two points are varied by changing the armature connections. Thus on the first point all of the field-coils of each motor are in series, while the two sets of armature-windings of each motor are in series with each other, each pair being in multiple with the pair of the other motor. On the second point, with the field connections unchanged, all four of the sets of armature-windings are put in multiple. The armature connections for the third and fourth points are the same as for the first and second points, the field-magnets, however, being changed so that the two sets of six magnets connected in series are in multiple with each other upon both points, as indicated at 11 and 12. With a certain resistance of field and armature windings and a constant voltage between the supply-mains the amount of current flowing through the two motors on the first two points varies from 1.4 to 1.5 amperes, this being increased until on the fourth point, or that indicated at 13 in Fig. 4, we have connected all of the armature-windings of the two motors in series with one another, but having changed the connections of the fields so that the field-windings of each motor are in multiple with one another, these being, moreover, connected each in three series each of two in multiple. With the same voltage as originally noted the current now flowing through the two motors has risen to 18.3 amperes, it being understood that this is the quantity of current which would flow if the armatures were held stationary and with the windings cold. For the purpose of comparison the counter electromotive force is disregarded. Passing now to the consideration of the points indicated by diagrams 14 to 19, inclusive, it will be seen that we gradually reduce the combined resistance of the two motors and increase their speed, with the consequent increase of the current passing through them, by various combinations of their field-coils and armature-windings. Upon reaching the point indicated at 19 it will be seen that the field-magnet coils of each motor are in multiple with one another, as are also the armature-windings, while the two motors are connected so that they are also in multiple with one another. Under actual working conditions such a combination with a given load on the motors would permit an amount of current to flow so that there would be a definite speed of rotation of said motors, and in still further speeding them up we change their connections so that from series machine they become shunt-machines, it being noted that the current from the line passes on the points indicated at 20 and 21 through the field-coils of each motor connected in series and thence direct to the negative main, the armature-windings on each motor upon the point 20 being connected in series, but the two machines being in parallel with one another. Upon the second shunt-point, as indicated at 21, the field-windings of each motor are still connected in series with one another directly between the positive and negative mains, while the armature-windings of each motor are in multiple with one another and also all directly connected across the said supply-main. Passing now to the points 22 and 23, it will be noted that we have altered the connections of the field-magnets of each motor, so that instead of producing three similar poles in three adjacent coils and poles of opposite polarity in the remaining three coils of each motor, as heretofore, we send a current through the field-windings, so that the magnets are alternately of opposite polarity, as ordinarily found in well-known motor practice. The connections to the brush-holders of each armature-winding are similarly arranged in the well-known manner, alternate brushes being in multiple with one another and on the point 22, the armature-windings of each motor being in series with one another, but as a unit being in multiple with those of the second motor. On the last point 23 the field connections are retained the same as upon the point 22; but the armature connections are altered so that all four of the armature-windings are in multiple with one another, utilizing their six brush-holders in the well-known way.

Having thus described our invention, we claim and desire to secure by Letters Patent—

1. The herein-described method of controlling two or more motors having armatures provided with two sets of windings, the same consisting in starting said motors as series machines, increasing their speed by first varying the relative connections of the individual field-magnets and of the various sets of armature-windings, then changing the connections of the motors so that they operate as shunt-machines, substantially as described.

2. The herein-described method of controlling two or more motors having armatures provided with two sets of windings, said method consisting in starting the motors as series machines increasing their speed by first varying the relative connections of the individual field-magnets and of the various sets of armature-windings, then changing the connections of the motors so that they operate as shunt-machines, and further increasing their speed by varying the relative connections of the sets of armature-windings, substantially as described.

3. The herein-described method of controlling two or more multipolar motors having armatures provided with two sets of windings, the same consisting in starting said motors as bipolar series machines, increasing their speed by first varying the relative connections of the individual field-magnets and of the various sets of armature-windings, then changing the connections of the motors so that they operate as shunt-machines, and further increasing their speed by changing the armature connection, so that they continue operation as shunt-wound multipolar machines, substantially as described.

4. The herein-described method of controlling two or more multipolar motors, the same consisting in starting said motors with their elements connected, so that they operate as series-wound bipolar machines, then changing said connection so that said motors continue operation as shunt-wound multipolar machines, substantially as described.

5. The herein-described method of controlling two or more motors, the same consisting in starting said motors without external resistance and with their connections such that they operate as series-wound bipolar machines, then changing said connections so that the motors continue operation as shunt-wound multipolar machines, substantially as described.

6. The herein-described method of operating two or more motors, the same consisting in starting said motors as series machines in series with each other, changing the connections of the elements of the motors so that they operate as series machines in multiple with one another, then further changing said connections so that the motors continue operation as shunt-machines, substantially as described.

7. The herein-described method of operating two multipolar motors, the same consisting in starting said machine as bipolar series motors in series with each other, changing the connections of the elements of said motors, so that they operate as series machines in multiple with one another and further changing said connections so that said motors continue operation as multipolar shunt-machines, substantially as described.

8. The herein-described method of controlling two or more motors provided with armatures having two sets of windings, the same consisting in starting said motors as series machines in series with one another, increasing their speed by changing the connections of the sets of armature-windings, then changing said connections so that they operate as series machines in multiple with each other, again increasing their speed by varying the relative connections of the individual field-coils and of the sets of armature-windings and further increasing their speed by again changing the said connections so that they continue operation as shunt-wound machines, substantially as described.

9. The herein-described method of controlling two or more multipolar motors, provided with armatures having two sets of windings, the same consisting in starting said motors as bipolar series machines in series with one another, increasing their speed by changing the connections of the sets of armature-windings, then changing said connections so that they operate as series machines in multiple with each other, again increasing their speed by varying the relative connections of the individual field-coils and of the sets of armature-windings, and further increasing their speed by again changing the said connections so that they continue operation as multipolar shunt-wound machines, substantially as described.

In testimony whereof we have signed our names to this specification in the presence of two subscribing witnesses.

CHARLES W. KENNEDY.
FRANCIS A. POCOCK.

Witnesses:
MURRAY C. BOYER,
JOS. H. KLEIN.